United States Patent [19]

Snider

[11] 4,403,679
[45] Sep. 13, 1983

[54] ANGLE DRIVE LUBRICATOR

[75] Inventor: Philip A. Snider, Hicksville, Ohio

[73] Assignee: Cooper Industries, Inc., Houston, Tex.

[21] Appl. No.: 249,987

[22] Filed: Apr. 1, 1981

[51] Int. Cl.³ .................................................. F16N 7/18
[52] U.S. Cl. .................................... 184/64; 173/163; 184/106
[58] Field of Search ..................... 184/102, 64, 5, 16, 184/22, 25, 612; 173/163; 74/468

[56] References Cited

U.S. PATENT DOCUMENTS

| | | | |
|---|---|---|---|
| 1,956,644 | 5/1934 | Hamerly | 184/55 |
| 1,979,007 | 10/1934 | Morton | 74/468 |
| 2,099,280 | 11/1937 | Shaff | 121/34 |
| 2,148,274 | 2/1939 | Lund | 184/102 X |
| 2,308,973 | 1/1943 | Crocker | 184/102 UX |
| 2,443,143 | 6/1948 | Madsen | 184/64 X |
| 2,640,742 | 6/1953 | Harkenrider | 184/102 X |
| 3,146,856 | 9/1964 | Enders | 184/102 |
| 3,162,268 | 12/1964 | Short | 184/5 |
| 3,719,254 | 3/1973 | Snider | 184/64 |
| 3,901,098 | 8/1975 | Jinkins | 74/417 |

Primary Examiner—David H. Brown
Attorney, Agent, or Firm—Wilson, Fraser, Barker & Clemens

[57] ABSTRACT

A lubricator for an angle drive attachment for pneumatic rotary tools is disclosed. An output shaft of the angle drive attachment is surrounded by a stationary lubricating sleeve. The lubricator can include an upper portion and a lower portion formed of different absorbent materials. The upper portion can be formed of a highly absorbent material such as felt so as to act as a reservoir and reabsorb lubricant which has been thrown off of the gears while the tool is in operation. The lower portion of the lubricator can be formed of a less absorbent porous material such as open cell styrofoam to slowly meter the lubricant onto the gears through capillary action. Alternatively, the angle drive lubricator can be formed of a single piece of absorbent material.

10 Claims, 2 Drawing Figures

ANGLE DRIVE LUBRICATOR

BACKGROUND OF THE INVENTION

1. Field of the Invention

The present invention relates in general to air-operated tools and in particular to an angle drive lubricator for a pneumatic rotary tool.

2. Description of the Prior Art

As with all machinery, the proper lubrication of the working parts of a pneumatic rotary tool is a critical design feature. Because such rotary tools are typically small and portable, the lubricating mechanism must be compact so as to fit within the narrow confines of the tool. It is also desirable for the lubricating mechanism to recirculate lubricant within the tool, thereby reducing maintenance requirements.

Early pneumatic tools provided various self-lubricating means. Some, such as U.S. Pat. No. 1,979,007 to Morton, utilize a simple oil reservoir having an outlet for feeding lubricant from the reservoir to the gear teeth. U.S. Pat. No. 1,956,644 to Hamerly discloses an oil regulator for pneumatic tools wherein a cartridge of packed felt or other oil cleaning material is inserted in a passage between the oil reservoir and the air inlet passage of the tool. Compressed air entering the tool passes through the cartridge into the oil reservoir creating pressure on the oil therein and, at the same time, removing any dirt or other foreign matter collected on the cartridge. When the pressurized air is removed from the tool, the air travels in the opposite direction from the reservoir carrying oil with it through the cartridge and into the motor section of the tool to lubricate the parts.

U.S. Pat. No. 3,719,254 to Snider discloses a lubricated angle drive attachment for an air-operated tool. An output shaft is surrounded by a housing which is hollow so as to constitute a lubricant reservoir. A sleeve of absorbent material is disposed within the housing for rotation with the output shaft. Lubricant is centrifugally thrown onto the gears as the output shaft and the absorbent sleeve rotate. Lubricant is thus supplied directly onto the teeth of a bevel gear and into the zone of intermesh between the gears and a bevel pinion.

SUMMARY OF THE INVENTION

The present invention relates to a lubricator for an angle drive attachment for a pneumatic rotary tool. An output shaft of the angle drive attachment is surrounded by a stationary lubricating sleeve. The lubricator can include an upper portion and a lower portion formed of different absorbent materials. The upper portion can be formed of a highly absorbent material such as felt so as to reabsorb lubricant which has been thrown off of the gears while the tool is in operation. The highly absorbent upper portion also acts as a reservoir to store the lubricant. The lower portion of the angle drive lubricator can be formed of a less absorbent porous material such as open cell styrofoam to slowly meter the lubricant onto the gears through capillary action. Alternatively, the angle drive lubricator can be formed of a single piece of absorbent material.

It is an object of the present invention to effectively lubricate the gears of an angle drive attachment for a pneumatic rotary tool.

It is another object of the present invention to lubricate such gears of a rotary tool utilizing capillary action.

It is a further object of the present invention to recapture and recirculate lubricant which has been thrown off of the gears of an operating rotary tool.

Other objects and advantages of the present invention will become apparent to those skilled in the art from the following detailed description of the preferred embodiment of the invention when considered in light of the accompanying drawings.

DETAILED DESCRIPTION OF THE PREFERRED EMBODIMENT

Figure 1:
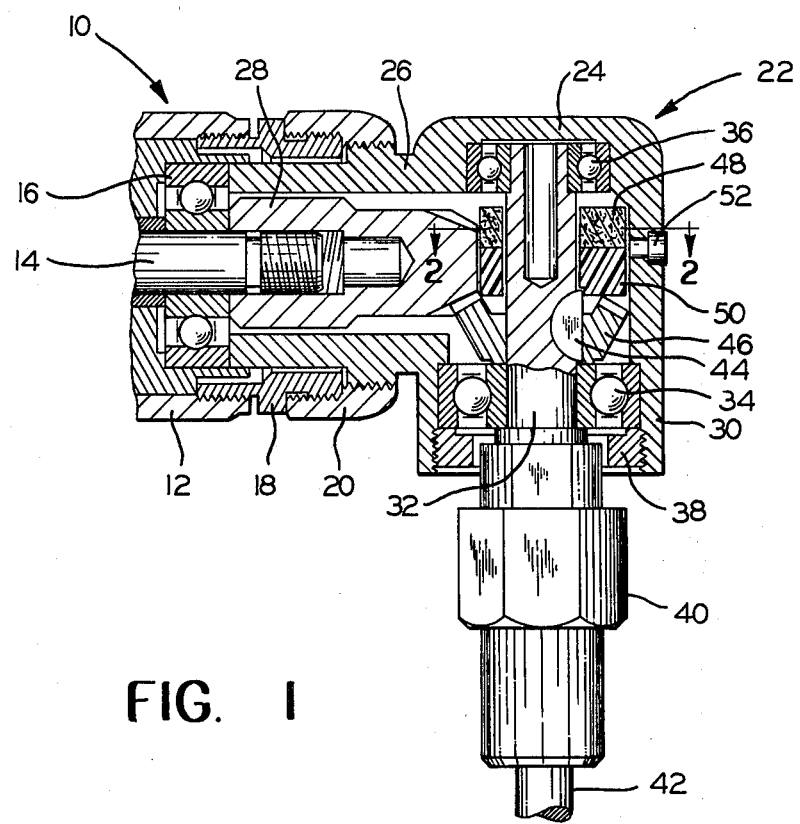
FIG. 1 is a side elevational view, partially in cross-section, of an angle drive attachment for a pneumatic rotary tool embodying an angle drive lubricator in accordance with the present invention.

Referring now to the drawings, there is illustrated in FIG. 1 a portion of a pneumatic rotary tool 10 embodying an angle drive lubricator in accordance with the present invention. The tool 10 is conventional in the art and includes an air motor (not shown) which is rotatably encased within an outer housing 12. The air motor is connected to a drive shaft 14 such that the drive shaft 14 is rotated when pressurized air is supplied to the motor. The drive shaft 14 is rotatably supported at one end by a ball bearing 16.

The outer housing 12 of the air tool 10 is threadably connected by a thimble 18 and a nut member 20 to an angle drive attachment, indicated generally at 22. The angle drive attachment 22 includes an angular housing 24, one leg 26 of which is secured to the nut member 20. Extending into the one leg 26 of the angular housing 24 is a spiral bevel pinion 28 which is screwed onto the end of the rotating drive shaft 14 and which engages the inner race of the ball bearing 16.

The other leg 30 of the angular housing 24 has an output shaft 32 which is journaled in the housing 24 by ball bearings 34 and 36 and which is retained in the housing 24 by a screw member 38 which clamps the outer race of the lower ball bearing 34 against a shoulder in the housing 24. The output shaft 32 is provided with a collet chuck 40 or the like for gripping the shank of a tool shaft 42 for rotation about an axis perpendicular to the axis of rotation of the drive shaft 14.

The upper ball bearing 36 is of the pre-lubricated type having shields at both its upper and lower ends. The lower ball bearing 34 is of a similar pre-lubricated type, having a shield at its upper end and a seal at its bottom end.

Keyed to the output shaft 32 by means of a key 44 is a spiral bevel gear 46 which meshes with the bevel pinion 28. The bevel gear 46 is counterbored with the upper end portion of the key 44 extending upwardly into such counterbore.

Figure 2:
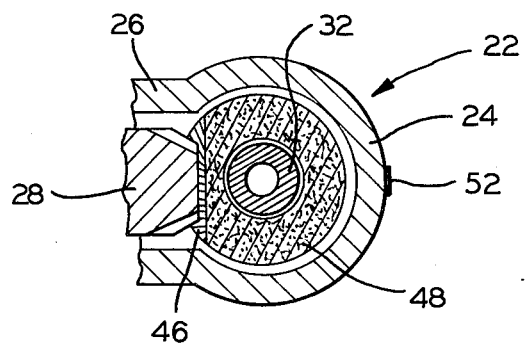
FIG. 2 is a cross-sectional view taken along line 2—2 of FIG. 1.

Between the upper bearing 36 and the bevel gear 46 and surrounding the output shaft 32 in radially spaced relation is disposed an angle drive lubricator having an upper portion 48 and a lower portion 50. The upper portion 48 of the angle drive luricator can be formed of any highly absorbent material such as synthetic or natural felt. The lower portion 50 of the angle drive lubricator can be formed of a porous, less absorbent material such as open cell styrofoam. The pores of the lower portion 50 of the angle drive lubricator typically can be formed 30 to 200 microns in diameter depending upon the viscosity of the lubricant, the temperature of the tool, and other factors which affect the metering of the lubricant. It has been found that the pore size of 70 microns is desirable for most applications. It will be appreciated from FIG. 2 that the upper and lower portions 48 and 50 of the angle drive lubricator generally conform to the interior of the angular housing 24 and include flat surfaces for engaging the end of the bevel pinion 28 to prevent rotation within the housing 24. The upper portion 48 and the lower portion 50 of the angle drive lubricator can be secured together as a single unit by a staple (not shown) or other conventional means. A grease fitting 52 is held in the angular housing 24 to permit lubricant to be added to the angle drive lubricator. The grease fitting 52 is conventional in form and may include a spring-seated ball which is unseated by lubricant under pressure from a pressure gun. Such lubricant is introduced into the angle drive lubricator until the upper and lower portions 48 and 50 are fully saturated.

In operation, lubricant which is contained in the lower portion 50 of the angle drive lubricator is slowly and evenly metered downwardly onto the spiral bevel gear 46. The porosity of the material forming the lower portion 48 will determine how rapidly lubricant will be dispersed therethrough onto the bevel gear 46. The gear 46 continuously receives lubricant from the lower portion 50 of the angle drive lubricator, thus ensuring adequate lubrication in the zone of intermesh between the bevel gear 46 and the bevel pinion 28.

The absorbent felt upper portion 48 of the angle drive lubricator acts as a reservoir for storing the lubricant. As lubricant is metered onto the bevel gear 46, the lubricant in the upper portion 48 reservoir will be attracted to the lower portion 50 to establish an equalibrium balance of lubricant between the upper and lower portions 48 and 50. This capillary attraction provides a steady and continuous supply of lubricant to the lower portion 50 of the angle drive lubricator. The absorbent upper portion 48 readily reabsorbs lubricant which is centrifugally thrown off of the teeth of the bevel gear 46 and the bevel pinion 28 as the air tool 10 is operated. The upper portion 48 also acts as a filter to remove some of the dirt or other foreign matter which is contained in the absorbed lubricant.

It will be appreciated that the composition of the upper and lower portions 48 and 50 of the angle drive lubricator can be varied depending upon the nature of the tool 10 and its associated lubrication requirements. By varying the size and density of the upper and lower portions 48 and 50, the oil capacity and the rate of metering of the lubricant can be correlated to the speed of the operation of the tool or other desired characteristics. Although the angle drive lubricator is illustrated as having an upper portion 48 and a lower portion 50 formed of different materials, it will be further appreciated that the lubricator may be comprised of a single stationary absorbent element for metering lubricant onto the gear 46.

In accordance with the provisions of the patent statutes, the principle and mode of operation of the present invention have been described and illustrated in its preferred embodiment. However, it must be understood that the invention can be practiced otherwise than as specifically illustrated and described without departing from its spirit or scope.

What is claimed is:

1. In a tool having a motor housing with a rotatable drive shaft at one end terminating in a bevel pinion, an angle drive attachment comprising:
    an angular housing having a first leg and a second leg;
    an output shaft journalled in said second leg of said angular housing;
    a bevel gear secured to said output shaft and disposed for engagement and rotation with the bevel pinion;
    an annular absorbent sleeve disposed within said housing and adjacent said bevel gear; and
    means for maintaining said absorbent sleeve stationary within said housing.

2. An angle drive attachment in accordance with claim 1 wherein said angular housing includes a lubricant fitting for introducing lubricant into said sleeve.

3. The angle drive attachment of claim 1 further including means on said first leg for securing said angular housing to the motor housing.

4. The angle drive attachment of claim 1 wherein said annular absorbent sleeve is radially spaced from said output shaft.

5. The angle drive attachment of claim 1 wherein said absorbent sleeve includes a first region disposed and facing away from said bevel gear and a second region disposed and facing toward said bevel gear, said first and second regions having distinct lubricant absorption characteristics.

6. An angle drive attachment in accordance with claim 5 wherein said first region of said stationary sleeve is formed of a highly absorbent material such as felt.

7. An angle drive attachment in accordance with claim 5 wherein said second region of said stationary sleeve is formed of a porous material such as an open cell styrofoam.

8. In a tool having a motor housing with a rotatable drive shaft at one end terminating in a bevel pinion, an angle drive attachment comprising:
    an angular housing having a first leg and a second leg;
    an output shaft journalled in said second leg of said angular housing;
    a bevel gear secured to said output shaft and disposed for engagement and rotation with the bevel pinion;
    an annular absorbent sleeve disposed within said housing and adjacent said bevel gear, said absorbent sleeve having a first region disposed away from said bevel gear and a second region disposed adjacent said bevel gear, said first and second regions having distinct lubricant absorption and release characteristics; and
    means for maintaining said absorbent sleeve stationary within said housing.

9. The angle drive attachment of claim 8 wherein said first region of said annular sleeve is composed of a relatively dense material such as felt and said second region of said annular sleeve is composed of a relatively porous material such as open cell styrofoam.

10. The angle drive attachment of claim 8 wherein said means for maintaining said absorbent sleeve stationary is a flat surface on the periphery of said sleeve.

* * * * *